United States Patent
Gupta et al.

(10) Patent No.: US 11,423,386 B2
(45) Date of Patent: *Aug. 23, 2022

(54) SYSTEM AND METHOD OF FACILITATING CASH TRANSACTIONS AT AN ATM SYSTEM WITHOUT AN ATM CARD USING MOBILE

(71) Applicant: MASTERCARD INTERNATIONAL INCORPORATED, Purchase, NY (US)

(72) Inventors: Akshat Gupta, Vernon, CT (US); Ricardo Pareja, Sao Paulo (BR)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/090,524

(22) Filed: Nov. 5, 2020

(65) Prior Publication Data

US 2021/0150508 A1 May 20, 2021

Related U.S. Application Data

(63) Continuation of application No. 16/700,681, filed on Dec. 2, 2019, now Pat. No. 10,867,294, which is a
(Continued)

(51) Int. Cl.
 *G06Q 40/00* (2012.01)
 *G06Q 20/32* (2012.01)
 *G06Q 20/10* (2012.01)

(52) U.S. Cl.
 CPC ..... *G06Q 20/3221* (2013.01); *G06Q 20/1085* (2013.01)

(58) Field of Classification Search
 USPC ............ 705/35, 38, 39, 40, 45, 26; 235/375, 235/380; 706/46; 726/25, 2; 709/246;
 (Continued)

(56) References Cited

U.S. PATENT DOCUMENTS

| 5,650,604 A | 7/1997 | Marcous et al. |
| 6,045,039 A | 4/2000 | Stinson et al. |

(Continued)

FOREIGN PATENT DOCUMENTS

| CN | 101882343 A | 11/2010 |
| WO | WO-2012/177988 A1 | 12/2012 |

(Continued)

OTHER PUBLICATIONS

Online franchise capturing using IPv6 through Automated Teller Machines; 2013 International Conference on Recent Trends in Information Technology (ICRTIT) (pp. 562-568); Kausal Malladi, Srivatsan Sridharan; Jul. 25, 2013. (Year: 2013).*

(Continued)

*Primary Examiner* — Tien C Nguyen
(74) *Attorney, Agent, or Firm* — Ballard Spahr LLP

(57) ABSTRACT

A system, method, and computer-readable storage medium configured to facilitate cash transactions at an Automated Teller Machine when an ATM card is not present. The system allows a customer of a first bank to use an ATM of a different bank and still facilitate the ATM transaction without an ATM card present.

20 Claims, 5 Drawing Sheets

Related U.S. Application Data continuation of application No. 14/558,887, filed on Dec. 3, 2014, now Pat. No. 10,614,442.

(58) Field of Classification Search
USPC .......................................................... 707/793
See application file for complete search history.

(56) References Cited

U.S. PATENT DOCUMENTS

| | | | |
|---|---|---|---|
| 6,286,756 | B1 | 9/2001 | Stinson et al. |
| 6,636,833 | B1 | 10/2003 | Flitcroft et al. |
| 7,076,458 | B2 | 7/2006 | Lawlor et al. |
| 7,136,835 | B1 | 11/2006 | Flitcroft et al. |
| 7,567,934 | B2 | 7/2009 | Flitcroft et al. |
| 7,568,615 | B2 | 8/2009 | Corona et al. |
| 7,571,142 | B1 | 8/2009 | Flitcroft et al. |
| 7,593,896 | B1 | 9/2009 | Flitcroft et al. |
| 7,686,213 | B1 | 3/2010 | Ramachandran |
| 8,380,177 | B2 | 2/2013 | Laracey |
| 8,632,000 | B2 | 1/2014 | Laracey |
| 8,676,707 | B2 | 3/2014 | Flitcroft et al. |
| 8,725,640 | B2 | 5/2014 | Mateo Delgado et al. |
| 8,756,150 | B2 | 6/2014 | Flitcroft et al. |
| 8,924,712 | B2 | 12/2014 | Varadarajan et al. |
| 9,208,482 | B2 | 12/2015 | Laracey |
| 9,305,295 | B2 | 4/2016 | Laracey |
| 9,400,978 | B2 | 7/2016 | Laracey |
| 9,401,077 | B2 | 7/2016 | Laracey |
| 9,412,106 | B2 | 8/2016 | Laracey |
| 9,639,837 | B2 | 5/2017 | Laracey |
| 9,659,294 | B2 | 5/2017 | Laracey |
| 9,721,248 | B2 | 8/2017 | Bondesen et al. |
| 9,811,813 | B2 | 11/2017 | Laracey |
| 9,911,120 | B2 | 3/2018 | Laracey |
| 10,102,514 | B2 | 10/2018 | Laracey |
| 10,115,088 | B2 | 10/2018 | Laracey |
| 10,304,051 | B2 | 5/2019 | Laracey |
| 2002/0026426 | A1* | 2/2002 | Bennett ............... G07F 17/0014 705/64 |
| 2002/0152124 | A1* | 10/2002 | Guzman ............... G07F 19/202 705/16 |
| 2006/0206709 | A1 | 9/2006 | Labrou et al. |
| 2009/0024506 | A1 | 1/2009 | Houri |
| 2009/0070260 | A1 | 3/2009 | Flitcroft et al. |
| 2009/0078758 | A1* | 3/2009 | Crowell ............... G06Q 20/305 235/380 |
| 2010/0041365 | A1* | 2/2010 | Lott ....................... H04W 60/00 455/406 |
| 2010/0063905 | A1 | 3/2010 | De Tena Sainz |
| 2010/0291895 | A1* | 11/2010 | Drzyzga ............. G06Q 20/102 455/410 |
| 2011/0016047 | A1 | 1/2011 | Wu et al. |
| 2011/0137795 | A1* | 6/2011 | Nambiar ............. G06Q 20/40 235/379 |
| 2011/0238573 | A1 | 9/2011 | Varadarajan |
| 2012/0226610 | A1 | 9/2012 | Gill et al. |
| 2013/0218769 | A1 | 8/2013 | Pourfallah et al. |
| 2013/0226799 | A1 | 8/2013 | Raj |
| 2013/0246265 | A1 | 9/2013 | Al-Sahli |
| 2013/0262303 | A1 | 10/2013 | Metral |
| 2013/0268336 | A1 | 10/2013 | Prideaux et al. |
| 2013/0311313 | A1 | 11/2013 | Laracey |
| 2013/0339235 | A1 | 12/2013 | Tulluri et al. |
| 2014/0040052 | A1* | 2/2014 | Arthur ................... G06Q 20/12 705/16 |
| 2014/0108249 | A1* | 4/2014 | Kulpati .............. G06Q 20/3223 705/44 |
| 2014/0114855 | A1 | 4/2014 | Bajaj et al. |
| 2014/0263618 | A1 | 9/2014 | McCarthy et al. |
| 2015/0199671 | A1 | 7/2015 | Bajaj et al. |
| 2016/0007840 | A1 | 1/2016 | Boppart et al. |
| 2016/0063481 | A1 | 3/2016 | Gupta et al. |
| 2016/0104146 | A1 | 4/2016 | Peyton et al. |
| 2016/0162869 | A1 | 6/2016 | Gupta et al. |
| 2016/0180322 | A1 | 6/2016 | Song et al. |

FOREIGN PATENT DOCUMENTS

| | | |
|---|---|---|
| WO | WO-2015/029064 A2 | 3/2015 |
| WO | WO-2015/053470 A1 | 4/2015 |
| WO | WO-2015/054697 A1 | 4/2015 |
| WO | WO-2015/084755 A1 | 6/2015 |
| WO | WO-2015/172150 A1 | 11/2015 |
| WO | WO-2016/033513 A1 | 3/2016 |
| WO | WO-2016/089629 A1 | 6/2016 |
| WO | WO-2017/074665 A1 | 5/2017 |
| WO | WO-2018/005255 A1 | 1/2018 |
| WO | WO-2018/045134 A1 | 3/2018 |

OTHER PUBLICATIONS

Secure Authentication for ATM transactions using NFC technology; 2019 International Carnahan Conference on Security Technology (ICCST) (pp. 1-5); Divyans Mahansaria, Uttam Kumar Roy; Oct. 1, 2019. (Year: 2019).*

Betab et al.: Fingerprints in Automated Teller Machine—A Survey, Apr. 2014, International Journal of Engineering and Advanced Technology (IJEAT), vol. 3, Issue 4, pp. 183-186 (2014).

Mallat et al., Mobile Banking Services, (2004) Nol. 47, No. 5, Communications of the ACM.. (Year: 2004).

International Search Report and Written Opinion dated Feb. 4, 2016 for application PCT/US2015/061945, which was filed on Nov. 20, 2015 and published as WO 2016/089629 on Jun. 9, 2016 (Inventor—Gupta, et al.; Applicant—MasterCard International, Inc.) (20 pages).

International Preliminary Report on Patentability dated Jun. 6, 2017 for application PCT/US2015/061945, which was filed on Nov. 20, 2015 and published as WO 2016/089629 on Jun. 9, 2016 (Inventor—Gupta, et al.; Applicant—MasterCard International, Inc.) (6 pages).

International Search Report and Written Opinion of the International Search Authority dated Jan. 14, 2016 for application PCT/US2015/047518, filed on Aug. 28, 2015 and published as Wo 2016/033513 on Mar. 3, 2016 (Applicant—Mastercard Int'l, Inc. // Inventor—Knanchat, et al.) (11 pages).

International Preliminary Report on Patentability dated Feb. 28, 2017 for application PCT/US2015/047518, which was filed on Aug. 28, 2015 and published as WO 2016/033513 on Mar. 3, 2016 (Inventor—Knanchat, et al.; Applicant—Mastercard International, Inc.) (8 pages).

International Search Report and Written Opinion dated Nov. 8, 2017 by the International Searching Authority for International Application No. PCT/US2017/049544, filed on Aug. 31, 2017 and published as WO 2018/045134 on Mar. 8, 2018 (Applicant—Mastercard International Inc.) (11 Pages).

International Preliminary Report on Patentability dated Mar. 5, 2019 by the International Searching Authority for International Application No. PCT/US2017/049544, filed on Aug. 31, 2017 and published as WO 2018/045134 on Mar. 8, 2018 (Applicant—Mastercard International Inc.) (8 Pages).

International Search Report and Written Opinion dated Jan. 5, 2017 by the International Searching Authority for International Application No. PCT/US2016/055457, filed on Oct. 5, 2016 and published as WO 2017/074665 on May 4, 2017 (Applicant—Mastercard International Inc.) (8 Pages).

International Preliminary Report on Patentability dated May 1, 2018 by the International Searching Authority for International Application No. PCT/US2016/055457, filed on Oct. 5, 2016 and published as WO 2017/074665 on May 4, 2017 (Applicant—Mastercard International Inc.) (6 Pages).

International Search Report and Written Opinion dated Sep. 27, 2017 by the International Searching Authority for International Application No. PCT/US2017/038896, filed on Jun. 23, 2017 and published as WO 2018/005255 on Jan. 4, 2018 (Applicant-Mastercard International Inc.) (10 Pages).

International Preliminary Report on Patentability dated Jan. 1, 2019 by the International Searching Authority for International Application No. PCT/US2017/038896, filed on Jun. 23, 2017 and published

(56) References Cited

OTHER PUBLICATIONS as WO 2018/005255 on Jan. 4, 2018 (Applicant-Mastercard International Inc.) (7 Pages).

* cited by examiner

SYSTEM AND METHOD OF FACILITATING CASH TRANSACTIONS AT AN ATM SYSTEM WITHOUT AN ATM CARD USING MOBILE

CROSS-REFERENCE TO RELATED PATENT APPLICATION

This application is a continuation of U.S. application Ser. No. 16/700,681, filed on Dec. 2, 2019, which is a continuation of U.S. application Ser. No. 14/558,887, filed on Dec. 3, 2014, which are herein incorporated by reference in their entireties.

BACKGROUND

Aspects of the disclosure relate in general to financial services. Aspects include an apparatus, system, method and computer-readable storage medium to facilitate cash transactions at an Automated Teller Machine (ATM) when an ATM card is not present.

DESCRIPTION OF THE RELATED ART

An Automated Teller Machine or Automatic Teller Machine (ATM), also known as an Automated Banking Machine (ABM), or cash machine, is an electronic telecommunications device that enables the consumers of a financial institution to perform financial transactions without the need for a human cashier, clerk or bank teller.

On ATMs, the consumer is identified by inserting a plastic ATM card with a magnetic stripe or a plastic smart card with a chip that contains a unique card number and some security information such as an expiration date, card verification value code (CVVC), or card verification code (CVC or CVC2). Authentication is provided by the consumer entering a personal identification number (PIN) on the ATM key pad.

Using an ATM, consumers can access their bank deposit or credit accounts in order to make a variety of transactions such as cash withdrawals, check balances, or deposit cash. If the currency being withdrawn from the ATM is different from that in which the bank account is denominated, the money will be converted at an official exchange rate. Thus, ATMs often provide good foreign exchange rates for travelers, and are widely used for foreign exchange.

SUMMARY

Embodiments include a system, device, method and computer-readable medium to facilitate cash transactions at an Automated Teller Machine when an ATM card is not present. Embodiments are open loop, allowing a customer of a first bank to use an ATM of a different bank and still facilitate the ATM transaction without an ATM card present.

In a payment network method embodiment, payment network uses a mobile phone to facilitate cash transactions at an Automated Teller Machine when an ATM card is not present. A cash request is received by an acquirer from a network interface. The cash request contains a mobile number and an amount. A processor matches the mobile number with an entry in a database stored on a non-transitory computer-readable storage medium. The entry indicates an issuer associated with the mobile number. The network interface transmits the cash request to the issuer. A consumer Primary Account Number and an Accountholder Authentication Value (AAV) value are received from the issuer by the network interface. The network interface transmits the consumer Primary Account Number and the AAV value to the acquirer for further processing with the Issuer.

DETAILED DESCRIPTION

One aspect of the disclosure includes the realization that in many areas of the world many people do not have an ATM card, but may have a mobile phone.

Another aspect of the disclosure includes the understanding that a mobile phone may be used to verify the identity of a user at an Automated Teller Machine.

As used herein, the terms "consumer," "customer," and "cardholder" are synonymous, and designate users of an embodiment of the present disclosure. In such embodiments, consumers/customers are payment cardholders.

Embodiments of the present disclosure include a system, method, and computer-readable storage medium configured to use a mobile phone to facilitate cash transactions at an Automated Teller Machine when an ATM card is not present. Embodiments are open loop, allowing a customer of a first bank to use an ATM of a different bank and still facilitate the ATM transaction without an ATM card present. In one embodiment, a consumer is identified in an ATM transaction using a Mobile Station International Subscriber Directory Number (MSISDN), which is a number uniquely identifying a subscription in a GSM or a UMTS mobile network. The MSISDN is generally the telephone number to the SIM card in a mobile/cellular phone.

These and other aspects may be apparent in hindsight to one of ordinary skill in the art.

Figure 1:
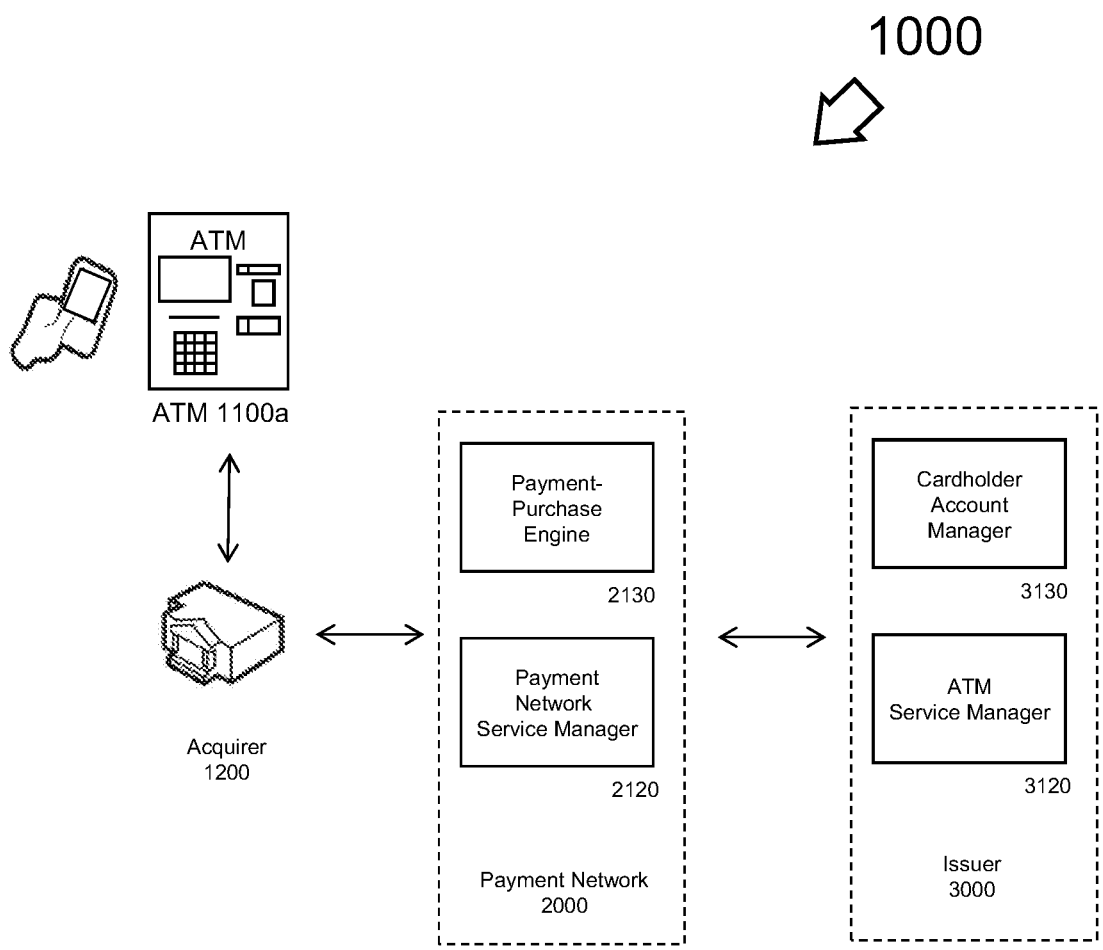
FIG. 1 depicts a system to facilitate cash transactions at an Automated Teller Machine when an ATM card is not present.

FIG. 1 depicts a system 1000 to facilitate cash transactions at an ATM when an ATM card is not present, constructed and operative in accordance with an embodiment of the present disclosure. System 1000 includes consumers using a plurality of computing devices to authenticate themselves at an Automated Teller Machine 1100 as part of a cash transaction.

The ATM 1100 is affiliated with a financial institution. This financial institution is usually called the "acquiring bank," "merchant bank" or "acquirer" 1200.

When a mobile phone is used at the ATM without an ATM card, the ATM 1100 electronically requests authorization from the acquirer 1200 for the transaction. In turn, acquirer 1200 communicates with the financial institution that issues the ATM card via a payment network.

Payment network 2000 is a network capable of processing payments electronically. An example payment network 2000 includes MasterCard International Incorporated of Purchase, N.Y. As described more elaborately in FIG. 2, payment network 2000 includes a payment-purchase engine 2130 and a payment network service manager 2120.

Figure 3:
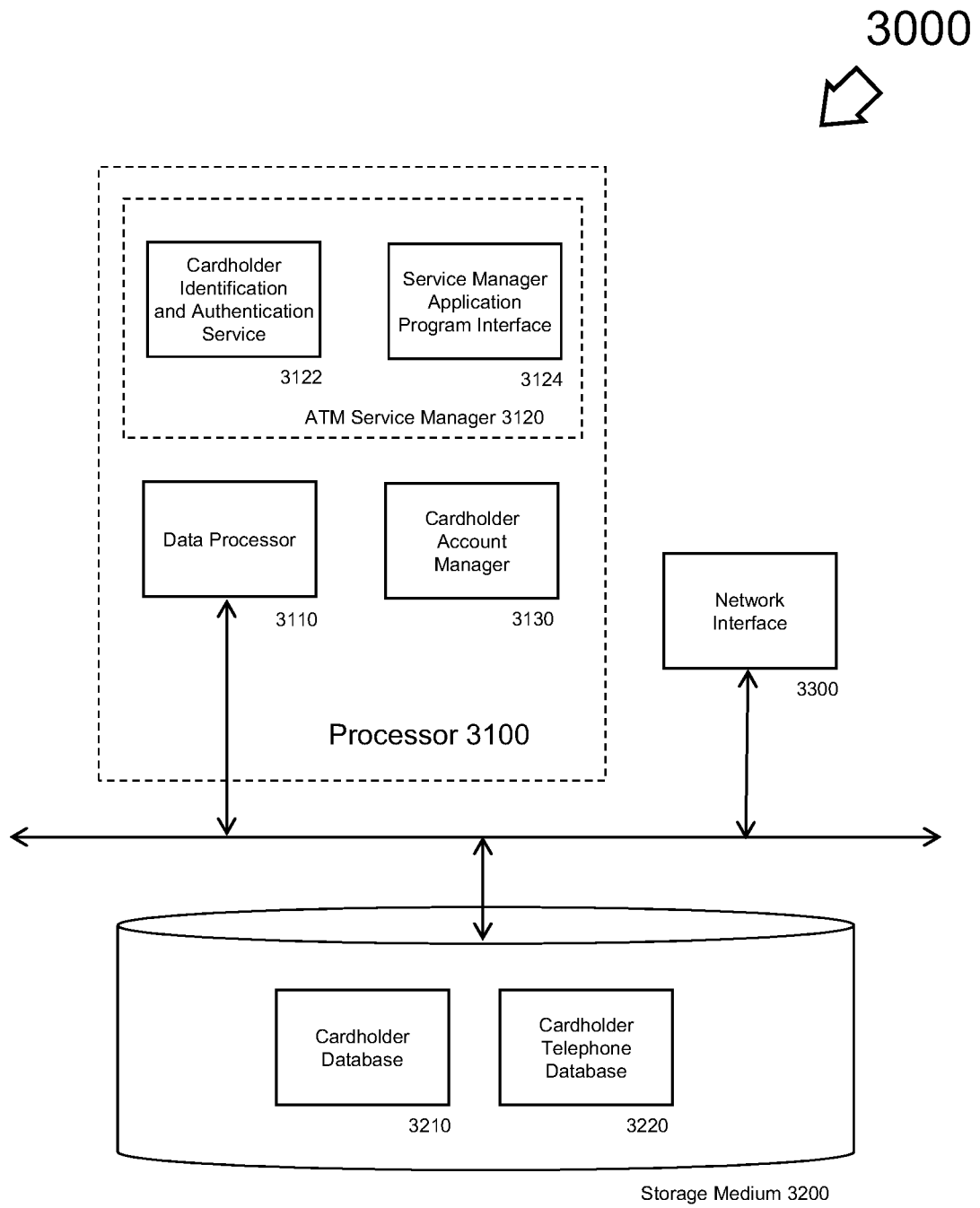
FIG. 3 is a block diagram of an issuer server configured to facilitate cash transactions at an ATM when an ATM card is not present.

The financial institution that issues the ATM card is called the "issuer bank" or "issuer 3000." As described more elaborately in FIG. 3, issuer 3000 includes a cardholder account manager 3130 and an ATM service manager 3120.

Figure 2:
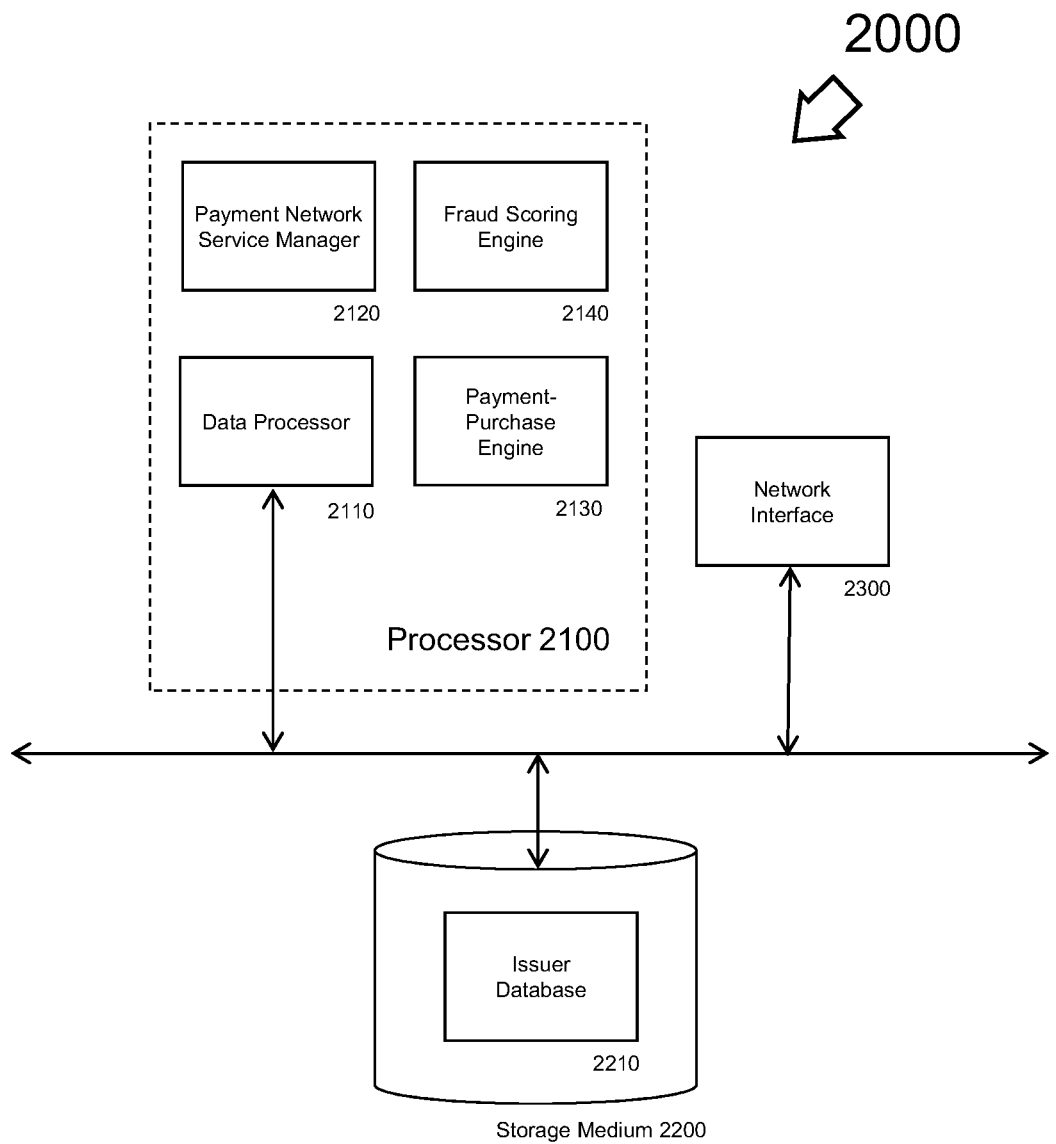
FIG. 2 is a block diagram of a payment network server configured to facilitate cash transactions at an ATM when an ATM card is not present.

Embodiments will now be disclosed with reference to a block diagram of an exemplary payment network 2000 of FIG. 2, constructed and operative in accordance with an embodiment of the present disclosure. Payment network 2000 is configured to facilitate cash transactions at an ATM when an ATM card is not present.

Payment network 2000 may run a multi-tasking operating system (OS) and include at least one processor or central processing unit (CPU) 2100, a non-transitory computer-readable storage medium 2200, and a network interface 2300.

Processor 2100 may be any central processing unit, microprocessor, micro-controller, computational device or circuit known in the art.

It is well understood by those in the art, that the elements of FIG. 2 may be implemented as hardware, firmware, or as software instructions and data encoded on a non-transitory computer-readable storage medium 2200.

As shown in FIG. 2, processor 2100 is functionally comprised of a payment network service manager 2120, a fraud scoring engine 2140, a payment-purchase engine 2130 and a data processor 2110.

Payment network service manager 2120 is configured to facilitate communication and authentication of a customer using a mobile phone at an ATM with an issuer 3000.

Fraud scoring engine 2140 is a structure that scores financial transactions from acquirer 1200 for fraud. Fraud scoring engine 2140 may use decision tree logic, association rule learning, neural networks, inductive logic programming, support vector machines, clustering, Bayesian networks, reinforcement learning, representation learning, similarity and metric learning, spare dictionary learning, and ensemble methods such as random forest, boosting, bagging, and rule ensembles, or a combination thereof.

Payment-purchase engine 2130 may be any structure that facilitates payment from customer accounts at an issuer 3000, to an ATM 1100. The customer accounts may include payment card accounts, checking accounts, savings accounts and the like.

Data processor 2110 interfaces with Random Access Memory (RAM) (not shown), storage medium 2200 and network interface 2300. The data processor 2110 enables processor 2100 to locate data on, read data from, and write data to, these components.

These structures may be implemented as hardware, firmware, or software encoded on a computer readable medium, such as storage medium 2200. Further details of these components are described with their relation to method embodiments below.

Network interface 2300 may be any data port as is known in the art for interfacing, communicating or transferring data across a computer network, examples of such networks include Transmission Control Protocol/Internet Protocol (TCP/IP), Ethernet, Fiber Distributed Data Interface (FDDI), token bus, or token ring networks. Network interface 2300 allows payment network 2000 to communicate with the customer mobile device, ATM 1100, acquirer 1200, or issuer 3000.

Computer-readable storage medium 2200 may be a conventional read/write memory such as a magnetic disk drive, floppy disk drive, optical drive, compact-disk read-only-memory (CD-ROM) drive, digital versatile disk (DVD) drive, high definition digital versatile disk (HD-DVD) drive, Blu-ray disc drive, magneto-optical drive, optical drive, flash memory, memory stick, transistor-based memory, magnetic tape or other computer-readable memory device as is known in the art for storing and retrieving data. Significantly, computer-readable storage medium 2200 may be remotely located from processor 2100, and be connected to processor 2100 via a network such as a local area network (LAN), a wide area network (WAN), or the Internet.

In addition, as shown in FIG. 2, storage medium 2200 may also contain an issuer database 2210. Issuer database 2210 facilitates the look-up of issuers 3000 as described below.

The function of these structures may best be understood with respect to the flowcharts of FIGS. 4-5, as described below.

Embodiments will now be disclosed with reference to a block diagram of an exemplary issuer server 3000 of FIG. 3, constructed and operative in accordance with an embodiment of the present disclosure. Issuer server 3000 is configured to facilitate cash transactions at an ATM when an ATM card is not present.

Issuer server 3000 may run a multi-tasking operating system (OS) and include at least one processor or central processing unit (CPU) 3100, a non-transitory computer-readable storage medium 3200, and a network interface 3300.

Processor 3100 may be any central processing unit, microprocessor, micro-controller, computational device or circuit known in the art.

It is well understood by those in the art, that the elements of FIG. 3 may be implemented as hardware, firmware, or as software instructions and data encoded on a non-transitory computer-readable storage medium 3200.

As shown in FIG. 3, processor 3100 is functionally comprised of an ATM service manager 3120, a cardholder account manager 3130, and a data processor 3110.

ATM service manager 3120 is configured to facilitate communication and authentication of a customer using a mobile phone at an ATM with a payment network 2000. ATM service manager 3120 may further comprise: cardholder identification and authorization service 3122 and service manager application program interface 3124. Cardholder identification and authorization service 3122 is the structure that analyzes and communicates with the cardholder mobile device to authenticate a mobile telephone. Working in conjunction with network interface 3300, service manager application program interface 3124 is the structure that enables communication with payment network service manager 2120.

Cardholder account manager 3130 is the structure that manages cardholder accounts, and may do so using a cardholder database 3210 and cardholder telephone database 3220.

Data processor 3110 interfaces with Random Access Memory (not shown), storage medium 3200 and network interface 3300. The data processor 3110 enables processor 3100 to locate data on, read data from, and write data to, these components.

These structures may be implemented as hardware, firmware, or software encoded on a computer readable medium, such as storage medium 3200. Further details of these components are described with their relation to method embodiments below.

Network interface 3300 may be any data port as is known in the art for interfacing, communicating or transferring data across a computer network, examples of such networks include Transmission Control Protocol/Internet Protocol (TCP/IP), Ethernet, Fiber Distributed Data Interface (FDDI), token bus, or token ring networks. Network interface 3300 allows issuer server 3000 to communicate with the customer mobile device, ATM 1100, acquirer 1200, or payment network 2000.

Computer-readable storage medium 3200 may be a conventional read/write memory such as a magnetic disk drive, floppy disk drive, optical drive, compact-disk read-only-memory (CD-ROM) drive, digital versatile disk (DVD) drive, high definition digital versatile disk (HD-DVD) drive, Blu-ray disc drive, magneto-optical drive, optical drive, flash memory, memory stick, transistor-based memory, magnetic tape or other computer-readable memory device as is known in the art for storing and retrieving data. Significantly, computer-readable storage medium 3200 may be remotely located from processor 3100, and be connected to processor 3100 via a network such as a local area network (LAN), a wide area network (WAN), or the Internet.

In addition, as shown in FIG. 3, storage medium 3200 may also contain a cardholder database 3210 and a cardholder telephone database 3220. Cardholder database 3210 is the structure that stores cardholder information, including cardholder account numbers, account balances, transaction history, available credit, and address information. Cardholder account numbers may include Primary Account Numbers (PANs) for ATM, credit, debit, or charge accounts. Cardholder telephone database is configured to store mobile telephone numbers associated with the cardholder.

It is understood by those familiar with the art that one or more of these databases 3210-3220 may be combined in a myriad of combinations. The function of these structures may best be understood with respect to the flowcharts of FIGS. 4-5, as described below.

Figure 4:
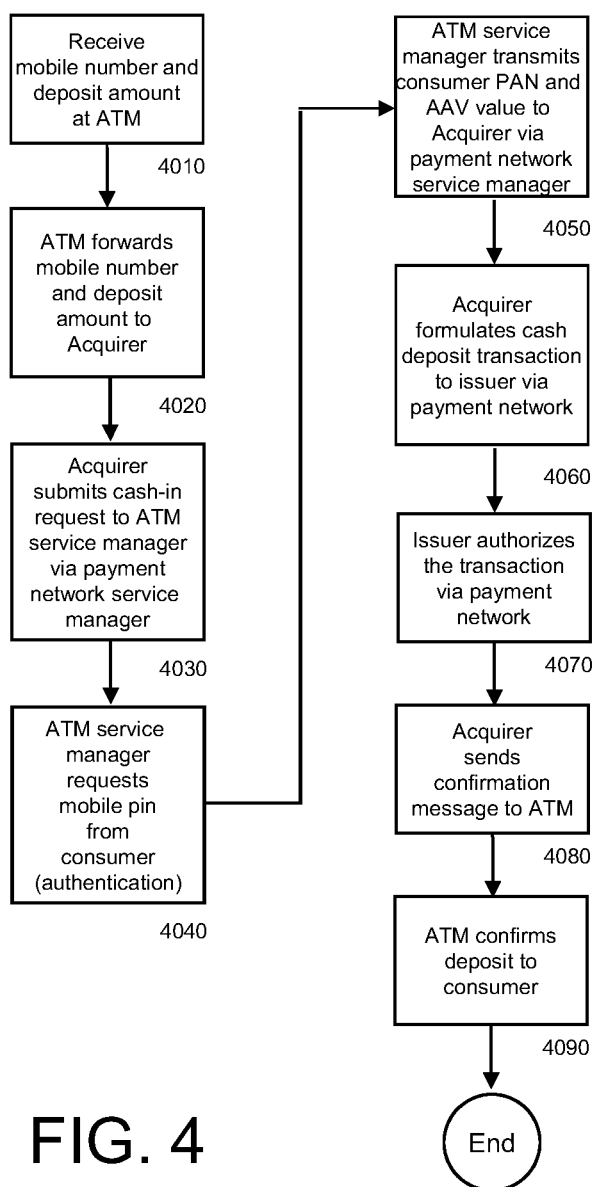
FIG. 4 is a flow chart of a method of performing a cash deposit ("cash-in") transaction at an ATM when an ATM card is not present.

FIG. 4 is a flow chart of a method 4000 of performing a cash deposit ("cash-in") transaction at an ATM when an ATM card is not present, constructed and operative in accordance with an embodiment of the present disclosure. In such an embodiment, the customer pre-registers their mobile number with the issuer 3000, and this information has been provided to payment network 2000, and is stored in issuer database 2210.

In method 4000, a customer deposits cash at an ATM when an ATM card is not present. At block 4010, instead of inserting an ATM card into the ATM, during the authentication phase, each cardholder enters their registered mobile number (MSISDN) into the ATM keypad. The cardholder then deposits the cash into the ATM, which is either counted by the ATM or the cardholder keys in the amount deposited. The mobile number, the amount of cash deposited, and an identifier for the ATM are transmitted to the acquirer 1200, block 4020.

The acquirer 1200 submits a cash-in request to the ATM service manager 3120, via the payment network service manager 2120, block 4030. The cash-in request includes the mobile number, the amount deposited, and ATM identifier. The payment network service manager 2120 is able to route ATM service manager 3120 by matching the registered telephone number with the issuer 3000.

ATM service manager 3120 matches the mobile number with a cardholder by performing a database match with cardholder telephone database 3220. The resulting database entry matches the mobile number with the cardholder and a mobile PIN (m-PIN). At block 4040, ATM service manager 3120 requests the mobile PIN from the customer's mobile phone or ATM. The ATM Service Manager 3120 is either directly capable of generating a smart Short Message Service (SMS) or via the service manager application program interface 3124. The service manager application program interface 3124 includes a SMS generator engine; a smart SMS challenge is sent to the consumer over the cellular network. The consumer receives this smart SMS which invokes the mobile app on the consumer's mobile phone. It is within this mobile application in which the consumer needs to enter the Mobile PIN. Once the consumer enters the mobile pin, the mobile PIN is encrypted and sent back to the ATM Service Manager 3120 over the cellular network for authentication.

If the m-PIN is incorrect, process 4000 stops.

If the correct m-PIN is received, the customer is authenticated, and the process continues.

ATM service manager 3120 transmits the consumer PAN and Accountholder Authentication Value (AAV) value to the acquirer 1200 via the payment network service manager 2120, block 4050.

The acquirer 1200 is then able to formulate the cash deposit transaction to the issuer 3000 via payment network 2000, block 4060. In one embodiment, the cash deposit transaction is formulated as an ISO message.

Issuer 3000 authorizes the transaction via payment network 2000, block 4070.

Acquirer then sends the confirmation to ATM 1100, block 4080.

The ATM then confirms the deposit to the customer, block 4090, and process 4000 ends.

Figure 5:
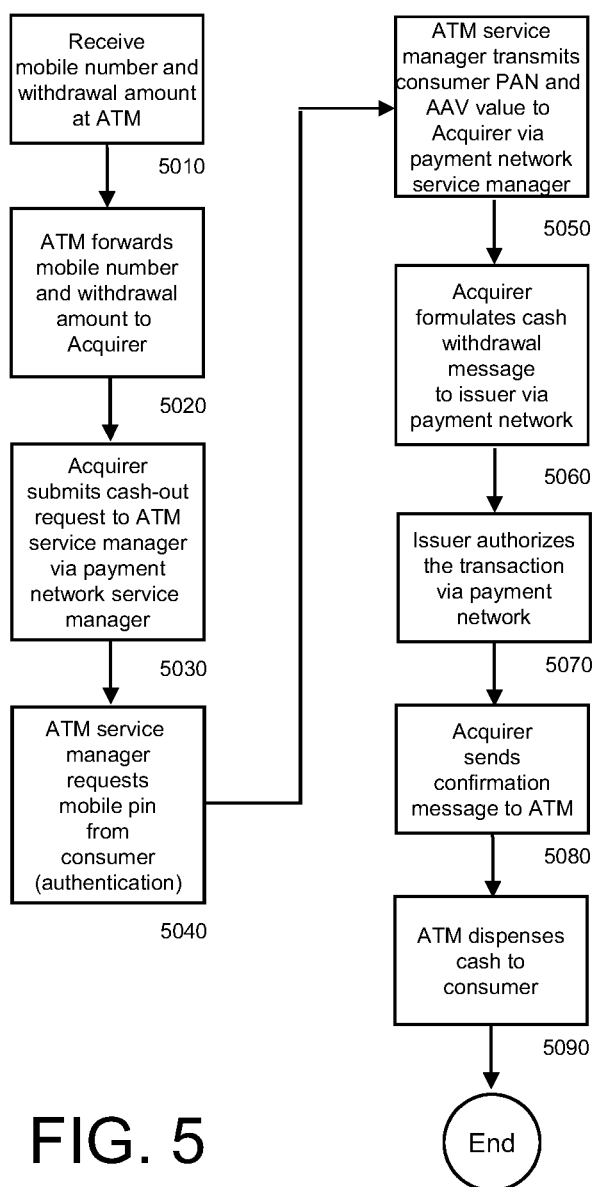
FIG. 5 is a flow chart of a method of performing a cash withdrawal ("cash-out") transaction at an ATM when an ATM card is not present.

FIG. 5 is a flow chart of a method of performing a cash withdrawal ("cash-out") transaction at an ATM when an ATM card is not present, constructed and operative in accordance with an embodiment of the present disclosure. In such an embodiment, the customer pre-registers their mobile number with the issuer 3000, and this information has been provided to payment network 2000, and is stored in issuer database 2210.

In method 5000, a customer is making a cash withdrawal at an ATM when an ATM card is not present. At block 5010, instead of inserting an ATM card into the ATM, during the authentication phase, each cardholder enters their registered mobile number (MSISDN) into the ATM keypad. The cardholder keys in the amount to be withdrawn. The mobile number, the withdrawal amount, and an identifier for the ATM are transmitted to the acquirer 1200, block 5020.

The acquirer submits a cash-out request to the ATM service manager 3120, via the payment network service manager 2120, block 5030. The cash withdrawal request includes the mobile number, the withdrawal amount, and ATM identifier.

At block 5040, ATM service manager 3120 requests a mobile PIN (m-PIN) from the customer's mobile phone or ATM. The ATM Service Manager 3120 is either directly capable of generating a smart Short Message Service (SMS) or via the service manager application program interface 3124. The service manager application program interface 3124 includes a SMS generator engine; a smart SMS challenge is sent to the consumer over the cellular network. The consumer receives this smart SMS which invokes the mobile app on the consumer's mobile phone. It is within this mobile application in which the consumer needs to enter the Mobile PIN. Once the consumer enters the mobile pin, the mobile PIN is encrypted and sent back to the ATM Service Manager 3120 over the cellular network for authentication.

If the m-PIN is incorrect, process 5000 stops.

If the correct m-PIN is received, the customer is authenticated, and the process continues.

ATM service manager 3120 transmits the consumer PAN and AAV value to the acquirer via the payment network service manager 2120, block 5050.

The acquirer 1200 is then able to formulate a cash withdrawal transaction to the issuer 3000 via payment network 2000, block 5060.

Issuer 3000 authorizes the transaction via payment network 2000, block 5070.

Acquirer then sends the confirmation to ATM 1100, block 5080.

The ATM then dispenses the withdrawal amount in cash to the customer, block 5090, and process 5000 ends.

The previous description of the embodiments is provided to enable any person skilled in the art to practice the disclosure. The generic principles defined herein may be applied to other embodiments. Thus, the present disclosure is not intended to be limited to the embodiments shown herein, but is to be accorded the widest scope consistent with the principles and features disclosed herein.

The invention claimed is:

1. A method comprising:
receiving, by a mobile device associated with a mobile number, a message from a first computing device associated with an issuer network, wherein the first computing device sends the message in response to receiving an account authorization request associated with a transaction at an Automated Teller Machine (ATM) in communication with an acquirer network;
causing, by the mobile device, in response to receiving the message, a user interface element to be displayed, wherein the user interface element is configured to allow a user to enter a mobile personal identification number (m-PIN);
receiving, at the user interface element, the m-PIN, wherein the m-PIN is associated with a Primary Account Number (PAN) and the mobile number; and
sending, by the mobile device to the first computing device, in response to receiving the m-PIN via the user interface element, an encrypted message comprising the m-PIN, wherein the first computing device, in response to receiving the encrypted message, sends the PAN and an indication that the user is authenticated to a second computing device associated with the acquirer network.

2. The method of claim 1, wherein the transaction is a withdrawal request comprising a withdrawal amount.

3. The method of claim 1, wherein the transaction is a deposit request comprising a deposit amount.

4. The method of claim 1, further comprising:
receiving, by the ATM, the mobile number and an amount associated with the transaction;
sending, by the ATM to the second computing device, in response to receiving the mobile number and the amount, the account authorization request comprising the mobile number and the amount; and
receiving, by the ATM from the second computing device, the PAN and the indication that the user is authenticated.

5. The method of claim 4, further comprising:
sending, by the ATM to the second computing device, a cash transaction request comprising the PAN and the amount;
receiving, by the ATM from the second computing device, a confirmation message indicative of an authorization of the cash transaction request; and
causing, by the ATM, based on the confirmation message, the amount to be dispensed.

6. The method of claim 1, further comprising:
receiving, by the first computing device, the account authorization request, the mobile number, and an amount associated with the transaction;
determining, by the first computing device, based on the mobile number, a personal identification number (PIN) and the PAN; and
receiving, by the first computing device from the second computing device, the encrypted message, wherein the encrypted message comprises the PIN.

7. The method of claim 6, further comprising:
transmitting, by the first computing device to the second computing device, the PAN and the indication that the user is authenticated;
receiving, by the first computing device from the second the computing device, a cash transaction request comprising the PAN and the amount; and
transmitting, by the first computing device to the second computing device, a confirmation message indicative of an authorization of the cash transaction request, wherein the second computing device transmits the confirmation message, upon receipt, to the ATM.

8. A method comprising:
receiving, by an Automated Teller Machine (ATM) in communication with an acquirer network, a mobile number and an amount;
sending, by the ATM to a first computing device associated with the acquirer network, in response to receiving the mobile number and the amount, an account authorization request comprising the mobile number and the amount;
receiving, by the ATM from the first computing device, a Primary Account Number (PAN) associated with the mobile number and an indication that the PAN is authenticated, wherein the first computing device sends the PAN and the indication to the ATM in response to receiving, via a mobile device associated with the mobile number, an encrypted message comprising a mobile personal identification number (m-PIN);
sending, by the ATM to the first computing device, a cash transaction request comprising the PAN and the amount;
receiving, by the ATM from the first computing device, a confirmation message indicative of an authorization of the cash transaction request; and
causing, by the ATM based on the confirmation message, the amount to be dispensed.

9. The method of claim 8, wherein the cash transaction request is a withdrawal request comprising a withdrawal amount.

10. The method of claim 8, wherein the cash transaction request is a deposit request comprising a deposit amount.

11. The method of claim 8, further comprising:
receiving, by the mobile device, a message from a second computing device associated with an issuer network, wherein the second computing device sends the message in response to receiving the account authorization request; and
causing, by the mobile device, in response to receiving the message, a user interface element to be displayed, wherein the user interface element is configured to allow a user of the mobile device to enter the m-PIN.

12. The method of claim 11, further comprising:
receiving, at the user interface element, the m-PIN, wherein the m-PIN is associated with the PAN and the mobile number; and sending, by the mobile device to the second computing device, in response to receiving the m-PIN via the user interface element, the encrypted message, wherein the second computing device, in response to receiving the encrypted message, sends the PAN and the indication that the PAN is authenticated to the first computing device.

13. The method of claim 8, further comprising:
receiving, by a second computing device associated with an issuer network, the account authorization request, a number associated with the mobile device, and the amount;
determining, by the second computing device, based on the number, a personal identification number (PIN) and the PAN;
and
receiving, by the second computing device, from the first computing device, the encrypted message, wherein the encrypted message comprises the PIN.

14. The method of claim 13, further comprising:
transmitting, by the second computing device to the first computing device, the PAN and the indication that the PAN is authenticated;
receiving, by the second computing device, from the first computing device, the cash transaction request; and
transmitting, by the second computing device to the first computing device, the confirmation message.

15. A method comprising:
receiving, by a first computing device associated with an issuer network, from a second computing device associated with an acquirer network, an account authorization request comprising:
　a mobile number associated with a mobile device, and an amount associated with a cash transaction request at an Automated Teller Machine (ATM) in communication with the acquirer network;
determining, by the first computing device, based on the mobile number, a personal identification number (PIN) and a Primary Account Number (PAN) associated with the mobile device;
transmitting, by the first computing device to the second computing device the PIN;
receiving, by the first computing device, from the second computing device, an encrypted message generated by the ATM, wherein the encrypted message comprises the PIN;
transmitting, by the first computing device to the second computing device, based on the encrypted message comprising the PIN, the PAN and an indication that the PAN is authenticated;
receiving, by the first computing device, from the second computing device, the cash transaction request comprising the PAN and the amount; and
transmitting, by the first computing device to the second computing device, a confirmation message indicative of an authorization of the cash transaction request, wherein the second computing device transmits the confirmation message, upon receipt, to the ATM.

16. The method of claim 15, wherein the cash transaction request is at least one of: a withdrawal request comprising a withdrawal amount or a deposit request comprising a deposit amount.

17. The method of claim 15, further comprising:
receiving, by the mobile device, a message from the first computing device, wherein the first computing device sends the message in response to receiving the account authorization request; and
causing, by the mobile device, in response to receiving the message, a user interface element to be displayed, wherein the user interface element is configured to allow a user of the mobile device to enter a mobile personal identification number (m-PIN).

18. The method of claim 17, further comprising:
receiving, at the user interface element, the m-PIN, wherein the m-PIN is associated with the PAN and the mobile number; and
sending, by the mobile device to the first computing device, in response to receiving the m-PIN via the user interface element, the encrypted message, wherein the encrypted message comprises the m-PIN.

19. The method of claim 15, further comprising:
receiving, by the ATM, the mobile number and the amount;
sending, by the ATM to the second computing device, in response to receiving the mobile number and the amount, the account authorization request, wherein the account authorization request comprises the mobile number and the amount; and
receiving, by the ATM from the second computing device, the PAN and the indication that the PAN is authenticated.

20. The method of claim 19, further comprising:
sending, by the ATM to the second computing device, the cash transaction request;
receiving, by the ATM from the second computing device, the confirmation message; and
causing, by the ATM based on the confirmation message, the amount to be dispensed.

* * * * *